UNITED STATES PATENT OFFICE.

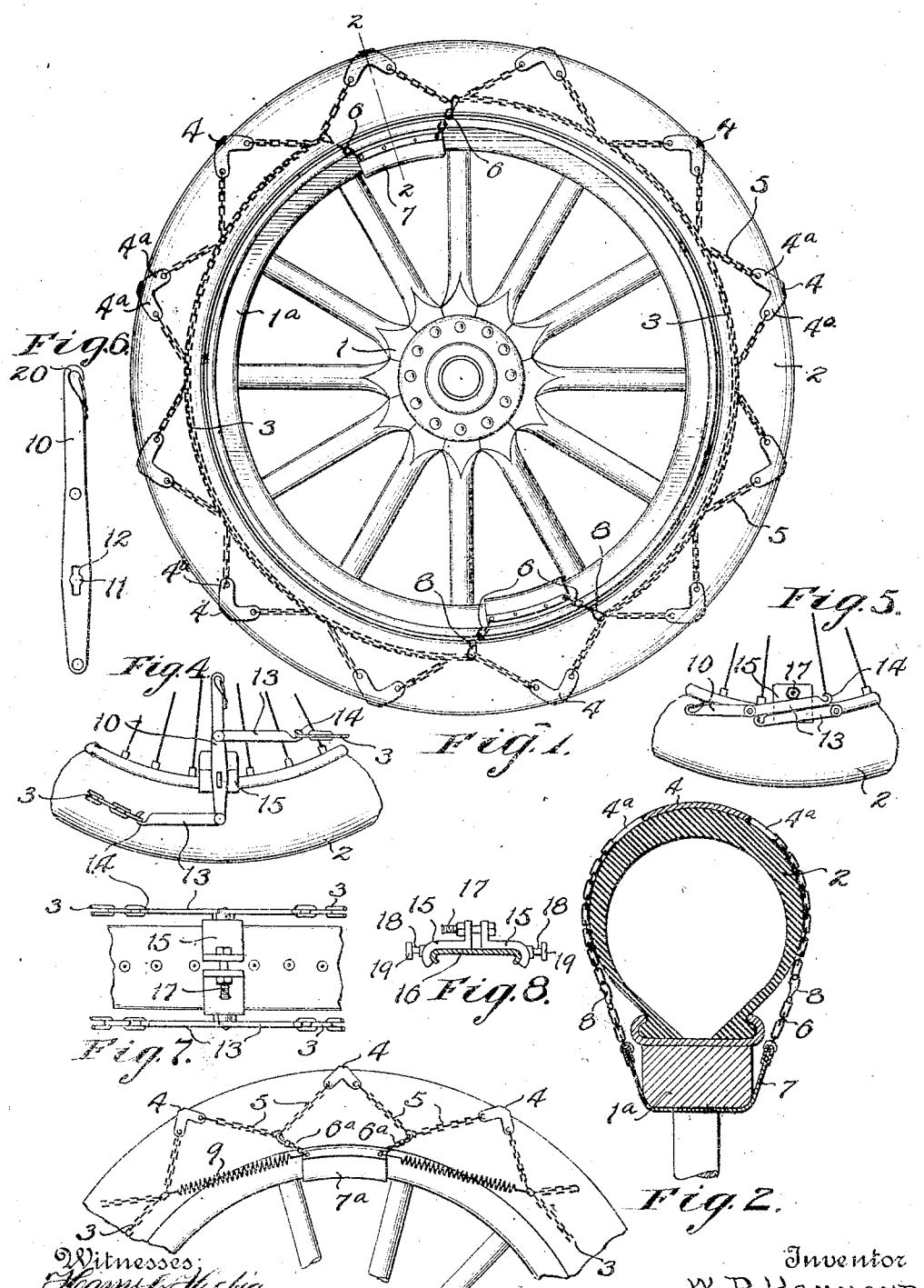

WILLIAM P. HAMMOND, OF PASSAIC, NEW JERSEY.

TIRE-CHAIN.

1,155,728.

Specification of Letters Patent.  Patented Oct. 5, 1915.

Application filed May 21, 1914. Serial No. 839,938.

*To all whom it may concern:*

Be it known that I, WILLIAM P. HAMMOND, citizen of the United States, residing at Passaic, in the county of Passaic and State of New Jersey, have invented certain new and useful Improvements in Tire-Chains, of which the following is a specification.

The present invention relates to certain new and useful improvements in tire chains, and has for its object to provide a device of this character which embodies novel features of construction whereby it can be easily and quickly applied to or detached from a tire and will operate in an effective manner to prevent skidding when in position upon the tire.

A further object of the invention is to provide a tire chain which is comparatively simple and inexpensive in its construction, which will not creep around the tire when in use, which is durable and effective in operation, and which cannot be negligently applied to the tire by a careless driver without placing the felly engaging anchor member in position.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a wheel provided with a tire having the anti-skidding chain applied thereto. Fig. 2 is an enlarged transverse sectional view on the line 2—2 of Fig. 1. Fig. 3 is a side elevation of a portion of a tire having a modification of the tire chain applied thereto. Fig. 4 is a side elevation of a portion of a tire and wheel, showing a further modification in which a tightening lever is employed for drawing the side chains into operative position, said lever being shown in inoperative position. Fig. 5 is a similar view showing the chain tightening lever in operative position. Fig. 6 is an enlarged detail view of the chain tightening lever. Fig. 7 is a bottom plan view of a portion of the wheel rim, showing the modified anchoring means applied thereto. Fig. 8 is a transverse sectional view through the wheel rim showing the anchoring element clamped thereon.

Corresponding and like parts are referred to in the following description and indicated in all the views of the drawing by the same reference characters.

Specifically describing the present embodiment of the invention, the numeral 1 designates a wheel which is formed with a rim or felly 1ª and has a conventional form of pneumatic tire 2 applied thereto. Side chains 3 are arranged upon opposite sides of the tire and are connected by anti-skid elements which extend across the tread of the tire. In the present instance these anti-skid elements include plates 4 which are transversely curved so as to conform to the shape of the tread of the tire, the plates being provided at opposite ends thereof with the diverging arms 4ª which are connected by diagonal chains 5 to the side chains 3. These diagonal chains 5 have substantially the same direction as the arms 4ˣ of the plates 4 and serve to retain the plates in proper position upon the tread of the tire when the device is mounted in position.

The side chains 3 are non-continuous and are of such a length that gaps or open spaces are provided between the ends thereof. These spaced ends of the side chains are connected to a rim or felly engaging anchoring element which extends between a pair of the spokes of the wheel, and the construction is such that the tire chain can not be mounted upon the tire without the use of the anchoring means, as might ordinarily be done by a careless driver. As shown by Fig. 1, each of the side chains 3 are formed in two sections and the extremities thereof are connected by anchor chains 6 to an anchor plate 7 which extends around the felly of the wheel. This anchor plate may be formed of any suitable material and is detachably connected to the side chains so that it can be placed in position and attached thereto after the side chains have been applied to the tire. For this purpose the anchor chains 6 are shown as permanently connected to the corners of the anchor plate 7 and as provided with snap hooks 8 adapted to engage the ends of the side chains 3. With this construction it will be obvious that the tire chain will not remain in position upon the tire unless the anchoring plates and chains are used, and these members not only hold the tire chain in position, but also prevent the same from creeping upon the wheel as is revolves.

A slight modification is shown by Fig. 3, in which the ends of the side chains 3 are connected by spring members 9 to the corners of the anchor plate 7ª, while anchor chains 5ª also connect the corners of the anchor plate 7ª to certain of the diagonal chains 5 which are employed in connection with tread plates 4 arranged in the gap between the ends of the side chains.

A further modification is shown by Figs. 4 to 8 inclusive, in which a lever 10 is utilized for drawing the ends of the side chains together so as to tighten the same and hold the tire chain in proper position upon the tire. This lever 10 is formed with a pivot opening 11 which intersects and is arranged intermediate of the ends of a slot 12, and at each side of the pivot opening 11 the lever is loosely connected to an arm 13, said arms extending in opposite directions and terminating in hooks 14 which engage the extremities of the side chains 3. The rim engaging anchor element, shown more clearly by Figs. 7 and 8, includes a pair of clamping elements 15 which are provided with jaws for engaging the rim or felly 16 and are connected by a clamping screw 17. Each of the jaws 15 is provided with a pivot stud 18 which terminates in a transversely disposed head 19. When the chain tightening lever 10 is moved into inoperative position, as indicated by Fig. 4, the slot 12 thereof is in registry with the transverse head 19 of the pivot stud 18 so that the latter can be removed from the pivot stud or applied thereto, while when the lever is swung into operative position, as indicated by Fig. 5, the slot 12 is turned out of registry with the transverse head 19 so that the lever is locked in position upon the pivot stud. It will thus be seen that the chain tightening lever has a detachable and interlocking connection with the pivot stud 18 so that the anchoring clamps 15 are permanently applied to the wheel rim 16, the lever being slipped upon the pivot studs when applying the device to the tire and being disengaged from the pivot studs when removing the device from the tire. The end of the lever 10 may be formed with a snap hook 20 adapted to engage one of the links of the side chain 3 when the lever is moved into operative position, thereby locking the entire device in proper position upon the tire.

The term finger operated as used in the specification and claims is intended to mean operated by manipulation without the use of a tool, while the term felly engaging anchor member is intended to mean a member firmly seated upon the felly whether or not it is directly fastened thereto.

Having thus described the invention, what I claim as new and desire to secure by Letters Patent, is:—

1. A non-skid tire chain including a side chain having a gap between the ends thereof so that the said ends are spaced apart and cannot be directly connected to each other when the chain is applied to a tire, a felly engaging anchor member adapted to be applied to the wheel felly, and link elements permanently connected to and carried by the felly engaging anchor member for detachably engaging the free ends of the side chain to bridge the gap between the same so that the chain cannot be used without the felly engaging anchor member and will be held against rotation thereby.

2. A non-skid tire chain including a side chain having a gap between the ends thereof, an anchor clamp adapted to be applied to the wheel, and a finger actuated tightening lever mounted upon the anchoring clamp and having an operative connection with the ends of the side chain so as to bridge the gap between the same.

3. A non-skid tire chain including a side chain having a gap between the ends thereof, a wheel engaging anchor clamp adapted to be rigidly mounted upon the wheel, a finger operated tightening lever having a detachable and interlocking connection with the anchoring clamp, and an operative connection between the said finger operated tightening lever and the ends of the side chain so as to bridge the before mentioned gap between the same.

4. A non-skid tire chain including a side chain having a gap between the ends thereof, a wheel engaging anchor clamp formed with a pivot stud and adapted to be rigidly mounted upon the wheel, a finger operated tightening lever mounted upon the pivot stud at an intermediate point in its length and having a detachable and interlocking connection therewith, and an operative connection between the ends of the side chain and the tightening lever so as to tighten the said side chain and bridge the gap between the ends thereof.

5. A non-skid tire chain including a side chain having a gap between the ends thereof, a wheel engaging anchor clamp rigidly applied to the wheel and provided with a pivot stud terminating in a transverse head, a chain tightening lever provided with a pivot opening and a slot intersecting the pivot opening and corresponding to the transverse head of the pivot stud so that the lever can be applied to the pivot stud or removed therefrom when turned into such a position that the slot is in registry with the transverse head, and an operative connection between the chain tightening lever and the ends of the side chain so as to bridge the gap between the latter.

6. A non-skid tire chain including a side chain having a gap between the ends thereof, a felly engaging clamp adapted to be rigidly applied to the felly between a pair of spokes, said clamp being formed with a pivot stud, a finger operated tightening lever pivotally mounted between its ends upon the pivot stud and constructed to have a detachable and interlocking connection therewith, and arms pivotally connected to the finger lever and constructed to have a detachable connection with the ends of the side chain so that the said ends can be drawn together and the gap between the same bridged.

7. A tire chain including side chains having gaps between the ends thereof, non-skid elements connecting the side chains so as to extend across the tread of the tire, a felly engaging anchor member provided with pivot studs terminating in transverse heads, chain tightening levers provided with pivot openings and slots intersecting the pivot openings and corresponding to the transverse heads of the pivot studs so that the levers can be applied to the pivot studs or removed therefrom when turned into such a position that the slots are in registry with the transverse heads, an operative connection between the chain tightening levers and the ends of the side chains, and means for locking the chain tightening levers in operative position.

In testimony whereof I affix my signature in presence of two witnesses.

WILLIAM P. HAMMOND.

Witnesses:
 WM. C. DUSEN,
 P. FRANK SONNEK.